US008967207B2

(12) United States Patent
Nezu et al.

(10) Patent No.: US 8,967,207 B2
(45) Date of Patent: Mar. 3, 2015

(54) MULTI-LAYER CYLINDRICAL MOLDED ARTICLE

(71) Applicant: Polyplastics Co., Ltd., Tokyo (JP)

(72) Inventors: Shigeru Nezu, Tokyo (JP); Masumi Tanikita, Tokyo (JP)

(73) Assignee: Polyplastics Co., Ltd., Tokyo (JP)

( * ) Notice: Subject to any disclaimer, the term of this patent is extended or adjusted under 35 U.S.C. 154(b) by 0 days.

(21) Appl. No.: 13/910,555

(22) Filed: Jun. 5, 2013

(65) Prior Publication Data

US 2013/0263959 A1 Oct. 10, 2013

Related U.S. Application Data

(63) Continuation-in-part of application No. 12/865,291, filed as application No. PCT/JP2008/070196 on Nov. 6, 2008, now abandoned.

(30) Foreign Application Priority Data

Jan. 31, 2008 (JP) .................................. 2008-020810

(51) Int. Cl.
*F16L 11/00* (2006.01)
*F16L 9/133* (2006.01)

(52) U.S. Cl.
CPC ..................................... *F16L 9/133* (2013.01)
USPC .......................... 138/137; 138/141; 428/36.91

(58) Field of Classification Search
CPC ................................. F16L 11/04; F16L 111/14
USPC ................................. 138/137, 141; 428/36.91
See application file for complete search history.

(56) References Cited

U.S. PATENT DOCUMENTS

| 5,705,550 A * | 1/1998 | Nakagawa ..................... 524/311 |
| 5,856,403 A * | 1/1999 | Senga et al. ..................... 525/64 |
| 7,887,660 B2 * | 2/2011 | Jeruzal et al. .................. 156/188 |

(Continued)

FOREIGN PATENT DOCUMENTS

| CN | 1322616 A | 11/2001 |
| EP | 1 270 671 A1 | 1/2003 |
| GB | 2267678 A | 12/1993 |

(Continued)

OTHER PUBLICATIONS

Notice of Reasons for Rejection issued to Chinese Application No. 200880125691.0, mailed Apr. 26, 2013.

(Continued)

*Primary Examiner* — James Hook
(74) *Attorney, Agent, or Firm* — Hoffmann & Baron, LLP

(57) ABSTRACT

The present invention provides a highly heat-resistant multi-layer molded article having excellent adhesion between layers and which can be inexpensively produced and easily recycled. The multi-layer molded article comprises an innermost layer including a first polyarylene sulfide-derived resin composition having 95% to 91% by mass of a polyarylene sulfide-derived resin and 5% to 9% by mass of an olefinic (olefine-derived) elastomer, and an outer layer disposed on an outer-side of the innermost layer, including a second polyarylene sulfide-derived resin composition having 5 to 35 parts by mass of reinforced fibers and 100 parts by mass of a third polyarylene sulfide-derived resin composition having 95% to 80% by mass of a polyarylene sulfide-derived resin and 5% to 20% by mass of an olefinic elastomer.

7 Claims, 3 Drawing Sheets

(56) References Cited

U.S. PATENT DOCUMENTS

2001/0031324 A1     10/2001     Rosenberg
2011/0305860 A1*     12/2011     Yung ........................... 428/36.9

FOREIGN PATENT DOCUMENTS

| JP | 63-126270 | | 5/1988 |
| JP | 2168093 | A | 6/1990 |
| JP | 3000195 | | 1/1991 |
| JP | 5-228990 | A | 9/1993 |
| JP | H07-100994 | | 4/1995 |
| JP | 11-228829 | A | 8/1999 |
| JP | 11-300844 | | 11/1999 |
| JP | 2003-021275 | | 1/2003 |
| JP | 2004069022 | A | 3/2004 |
| JP | 2005178183 | A | 7/2005 |

OTHER PUBLICATIONS

Notice of Reasons for Rejection issued to Japanese Application No. 2008-020810, mailed Sep. 10, 2013.
Notice of Reasons for Rejection issued to JP Application No. 2008-020810, mailed Apr. 16, 2013.
Supplemental Search Report issued to EP Application No. 08871960.4, mailed May 26, 2011.
English abstract of unexamined Utility Model Application Publication No. H03-195.

* cited by examiner

MULTI-LAYER CYLINDRICAL MOLDED ARTICLE

CROSS-REFERENCE TO RELATED APPLICATIONS

The instant application is a continuation-in-part of U.S. patent application Ser. No. 12/865,291, which is the National Stage of International Application No. PCT/JP2008/070196, filed Nov. 6, 2008, now pending, and incorporated by reference herein.

TECHNICAL FIELD

The present invention relates to a multi-layer cylindrical molded article produced from a polyarylene sulfide-derived resin (PAS).

BACKGROUND ART

In recent years, resinous molded articles have become popular as cylindrical molded articles such as pipes and the like, in view of easy processing, weight reduction and cost-reduction. However, the resin generally has a low heat resistance, and thus metallic molded articles are mostly used in fields which require heat resistance. For example, in a vehicle, a radiator-pipe connecting a radiator to an engine is often made of metal. In such a field, a heat-resistant resin is require, because of weight saving and inexpensive production.

To respond to these requirements, a multi-layer pipe which comprises polyphenylene sulfide (PPS) resin or a modified aromatic polyphenylene sulfide-derived resin is disclosed in Japanese Unexamined Patent Application, Publication No. H11-300844 (Patent Document 1), which is used in a vehicle. Also, a multi-layer pipe is disclosed in Japanese Unexamined Patent Application, Publication No. 2003-21275 (Patent Document 2), in which a property such as adhesion between layers in the multi-layer pipe of patent document 1 is improved.

[Patent Document 1] Japanese Unexamined Patent Application, Publication No. H11-300844
[Patent Document 2] Japanese Unexamined Patent Application, Publication No. 2003-21275

DISCLOSURE OF THE INVENTION

Problems to be Solved by the Invention

However, the pipe of Patent Document 2 has insufficient heat-resistance, and thus has a problem in that it cannot be used as a component in a diesel engine which requires a higher degree of heat-resistance; thus, it is necessary to improve the heat-resistance thereof.

After extruding the pipe, additional cost for bending process is also required for the multi-layer pipe described in Patent Document 2. Furthermore, the pipe described in Patent Document 2 consists of three layers, i.e. an innermost layer containing a PPS resin or a modified PPS resin, an intermediate mixed-layer containing a PPS resin or a modified PPS resin and a polyamide resin, and an outermost layer containing a polyamide resin, and uses at least two resin materials, and thus cannot recycle. Further, in the pipe described in Patent Document 2, using two different resins causes insufficient adhesion between layers, and thus results in delamination.

Therefore, there is a demand for providing a highly heat-resistant multi-layer molded article having excellent adhesion between layers and which consists of only one resin and can be inexpensively produced and recycled.

It is an object of the present invention to provide a highly heat-resistant multi-layer molded article having excellent adhesion between layers and which can be inexpensively produced and recycled.

Mean for Solving the Problems

In order to solve the above-mentioned problem, the present inventors have diligently researched. And They have consequently found that the problem can be solved by means of a multi-layer molded article using a polyarylene sulfide-derived resin and a polyarylene sulfide-derived resin containing a specific amount of a reinforced fiber, leading to completion of the present invention. More specifically, the present invention defined below is provided.

In a first aspect of the present invention a multi-layer blow molded article is provided with an innermost layer containing a first polyarylene sulfide-derived resin composition comprising 95% to 91% by mass of a polyarylene sulfide-derived resin and 5% to 9% by mass of an olefinic elastomer, and an outer layer disposed on an outer-side of the innermost layer, comprising a second polyarylene sulfide-derived resin composition containing 5 to 35 parts by mass of reinforced fiber and 100 parts by mass of a third polyarylene sulfide-derived resin composition having 95% to 80% by mass of a polyarylene sulfide-derived resin and 5% to 20% by mass of an olefinic elastomer.

According to the first aspect, the multi-layer molded article of the present invention uses only the polyarylene sulfide-derived resin as a resin material. The polyarylene sulfide-derived resin is one of the highly heat-resistant resins among thermoplastic resins. Thus, the multi-layer molded article according to the present invention has high heat-resistance compared to a conventional multi-layer molded article. Due to such high heat-resistance, the multi-layer molded article is suitable as a component exposed to high temperature. For example, the component exposed to high temperature includes a radiator-pipe for a diesel vehicle.

Furthermore, according to the first aspect, the multi-layer molded article of the present invention uses only one resin as the resin material, and thus the resin material can be recycled. Also, the multi-layer molded article is formed by means of the same resin, resulting in a good adhesion between layers. Such good adhesion can prevent delamination.

The term "polyarylene sulfide-derived resin" means a polyarylene sulfide resin or a modified polyarylene sulfide resin.

The term of "multi-layer molded article" means a multi-layer molded article having two or more layers and comprising an innermost layer containing the first polyarylene sulfide-derived resin composition and an outer layer disposed on an outer-side of the innermost layer, comprising the second polyarylene sulfide-derived resin composition containing the reinforced fiber. A shape of the multi-layer molded article includes, for example, a tubular hollow article, but is not limited thereto.

The "multi-layer" is not limited to two or more layers, however, in the case of two layers, a wall thickness ratio of the inner layer to the outer layer is preferably 1:1 to 1:5.

The polyarylene sulfide-derived resin composition containing the reinforced fiber in the outer layer may be same or different to the first polyarylene sulfide-derived resin composition, and is preferably the same as the first polyarylene sulfide-derived resin composition, since an excellent adhesion between layers results by good compatibility between layers.

According to the first aspect, the multi-layer molded article is produced by a blow molding method. The blow molding method is an excellent method for forming a hollow article and thus can easily produce a hollow multi-layer molded article with particularly high quality.

The multi-layer molded article of the present invention is preferably used as a radiator-pipe for a vehicle. However, as many components are closely arranged in a vehicle, it is necessary to place a radiator-pipe so as to avoid such components. For such reason, the radiator-pipe has a complicated shape. If a pipe is extruded, bending thereof has to be carried out so as to provide the complicated shape to the radiator-pipe with the multi-layer structure. However, in the case of the multi-layer blow molded article, it is not necessary to carry out the bending as secondary process, and thus the radiator-pipe with the desired shape can be easily formed.

A second aspect of the present invention provides the multi-layer molded article according to the first aspect, in which the multi-layer molded article is a multi-layer cylindrical molded article.

According to the second aspect, the multi-layer molded article of the present invention has the tubular shape, and the tubular article is widely used as a component in a variety of products. For example, such components include a pipe or a tube. Among these components, the multi-layer molded article of the present invention is appropriately used as a component which requires heat-resistance. In particular, replacing a metallic component with the multi-layer molded article of the present invention makes it possible to reduce weight and reduce cost.

A third aspect of the present invention provides the multi-layer molded article according to any one of first and second aspects, in which the melt viscosity of the first polyarylene sulfide-derived resin composition is from 300 Pa·s to 1500 Pa·s.

A fourth aspect of the present invention provides the multi-layer molded article according to any one of the first to third aspects, in which the melt viscosity of the second polyarylene sulfide-derived resin composition is from 450 Pa·s to 800 Pa·s.

According to either of the third or fourth aspect, the resin material of the composition has the above-mentioned melt viscosity, and thus can prevent the problem such as an uneven thickness due to decreasing the melt viscosity. Also, degrading the property of the article such as an impact resistance can be avoided. Therefore, it enables the production of a multi-layer molded article with an excellent property such as moldability or impact resistance.

A fifth aspect of the present invention provides the multi-layer molded article according to any one of the first to fourth aspects, in which the reinforced fiber is a glass fiber having an average fiber length of no greater than 3 mm.

According to the fifth aspect, the glass fiber has a light weight, high strength and high modulus, and can be easily available. For these reasons, the glass fiber is used as the reinforced fiber, and thus a high functional multi-layer molded article is easily produced.

A sixth aspect of the present invention provides the multi-layer molded article according to any one of first to fifth aspects, in which the multi-layer molded article is a three-dimensional blow molded article to be used as an internal combustion engine pipe.

According to the sixth aspect, the multi-layer molded article of the present invention is formed by a three-dimensional blow molded method, and thus a component count can be reduced. Therefore, production cost of the product which uses the multi-layer molded article can be reduced. Also, heat-resistance is required for the internal combustion engine pipe, and thus the multi-layer molded article of the present invention is preferably used as a component of an internal combustion engine. In particular, the polyarylene sulfide which constitutes the resin material of the multi-layer molded article has an excellent LLC-resistance (antifreeze solution having ethylene glycol as a main component), and thus the pipe can be preferably used as a radiator-pipe for a vehicle.

To connect the pipe to other components, a mounting part is usually required. In the case of an extrusion molded pipe or the like, it is necessary to bond the mounting part thereto afterwards. However, by means of the three-dimensional blow molded method, insert-molding the mounting part can be simultaneously carried out with molding the multi-layer molded article. Therefore, bonding process the mounting part is not necessary, and productivity of the completed article can be improved.

The material of the mounting part may be the same or different to the material of the three-dimensional blow molded pipe according to the present invention. However, if they are same material, thus adhesion between the pipe and the mounting part is enhanced by good compatibility.

Effects of the Invention

According to the present invention, the multi-layer molded article comprises an innermost layer containing a polyarylene sulfide-derived resin, and an outermost layer containing a polyarylene sulfide-derived resin composition having a specific amount of a reinforced fiber, and thus the multi-layer molded article has excellent adhesion between layers and high heat-resistance, and can be inexpensively produced and recycled.

EXPLANATION OF REFERENCE NUMERALS

Figure 1:
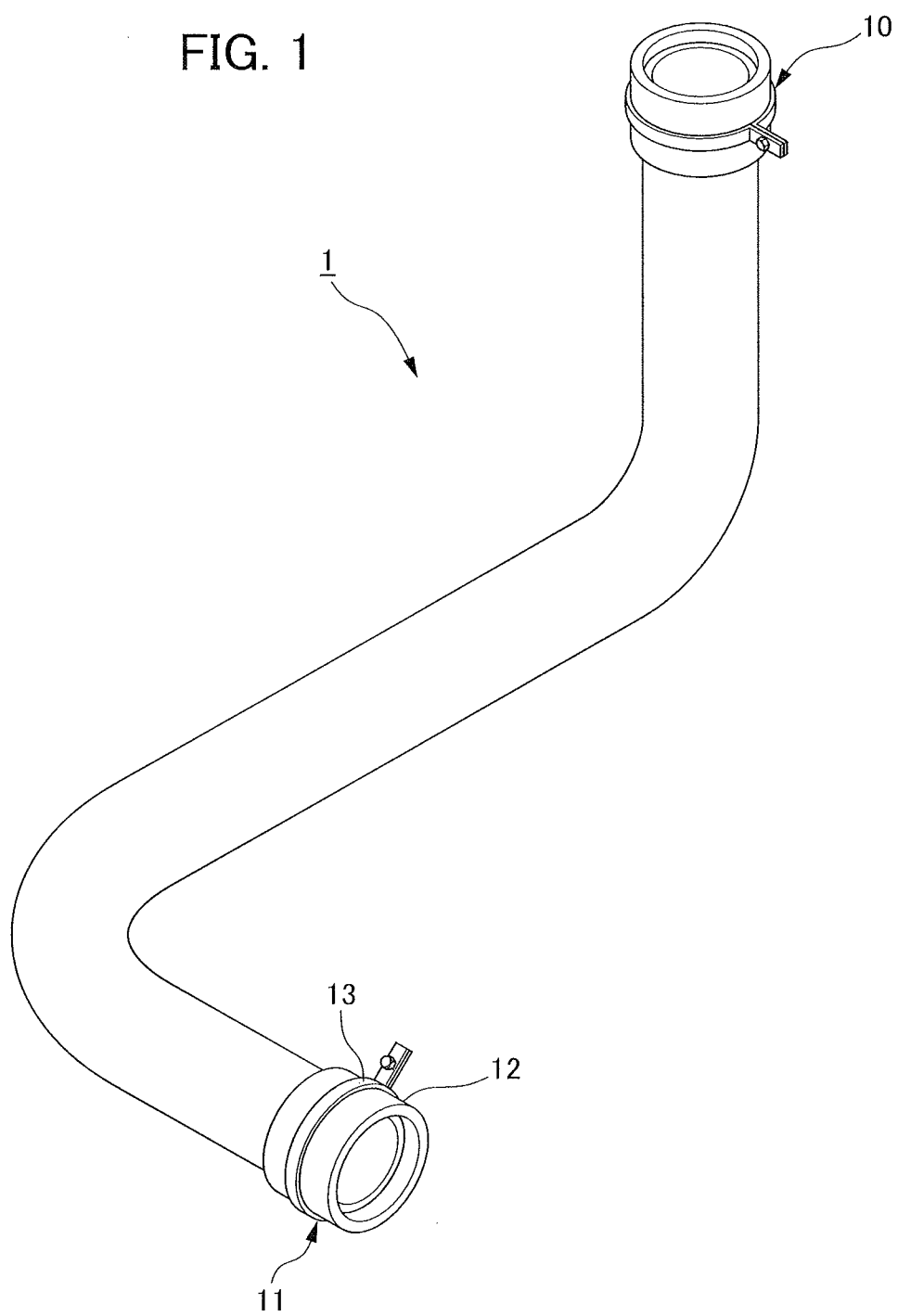
FIG. 1 is a schematic perspective view showing a radiator-pipe 1 for a vehicle in an example.

1 Radiator-pipe for a vehicle
10 First connection part
11 Second connection part
12 Silicon rubber
13 Metallic band

PREFERRED MODE FOR CARRYING OUT THE INVENTION

Embodiments of the present invention are explained in detail as follows. The present invention is not limited to the embodiments described below, and can be appropriately modified within the scope of the present invention. Also, if appropriate, overlapping explanations may be omitted, however, this does not in any way limit the scope of the present invention.

Polyarylene Sulfide-Derived Resin

The polyarylene sulfide-derived resin of the present invention mainly comprises —(Ar—S)— (Ar=Arylene group) as a repeating unit. In the present invention, a PAS resin having a generally known molecular structure can be used.

The arylene group includes, but is not specifically limited to, for example, p-phenylene group, m-phenylene group, o-phenylene group, substituted phenylene group, p,p'-diphenylenesulfone group, p,p'-biphenylene group, p,p'-diphenyleneether group, p,p'-diphenylenecarbonyl group, naphtylene group. Among arylene sulfide groups having the arylene groups, preference is given to a homopolymer using the same repeating units, as well as a polymer comprising repeating units having heterogeneous arylene sulfide groups.

Particular preference is given to a homopolymer which has a repeating unit of p-phenylene sulfide groups as the arylene group. The homopolymer with the p-phenylene sulfide group as the repeating unit has very high heat-resistance, and exhibits high strength, high stiffness and high dimensional stability over a wide temperature range. Due to such properties, it is desirable to use the homopolymer as the resin material of the multi-layer molded article of the present invention.

Among arylene sulfide groups having the arylene group, a combination of at least two different arylene sulfide groups can be polymerized to form a copolymer. Among these, a combination of p-phenylene sulfide group with m-phenylene sulfide group is preferably used in view of heat-resistance, moldability and mechanical property. It is desirable for the polymer to comprise no less than 70 mol % of the p-phenylene sulfide group, more preferably no less than 80 mol % of the p-phenylene sulfide group.

Among these polyarylene sulfide-derived resins, preference is given to a high molecular weight polymer with a substantially linear structure, obtained by polycondensation of a monomer which mainly consists of a bifunctional halogenated aromatic compound, but is not limited thereto. Also, it is possible to use a polymer with a partially branched or crosslinked structure, by employing a small amount of a monomer such as a polyhaloaromatic compound with three or more halogen substituents. Furthermore, it is possible to use a polymer with improved moldability and increased melt viscosity by means of heating a low molecular weight polymer with a linear structure at a high temperature in the presence of oxygen or an oxidizing agent, followed by oxidative crosslinking or thermal crosslinking.

In the case of mixing the polyarylene sulfide-derived resin having a branched structure and/or a crosslinked structure with the polyarylene sulfide-derived resin having a linear structure, preference is given to a polymer comprising 1% by mass to 30% by mass of the polyarylene sulfide-derived resin with the branched structure and/or the crosslinked structure based on 70 to 99% by mass of the linear polyarylene sulfide-derived resin. If an amount of the polyarylene sulfide-derived resin with the branched structure and/or the crosslinked structure is at least 1% by mass, sufficient melt tension for blow molding is achieved, and if the amount is no greater than 30% by mass, excellent moldability is achieved. More preferably, the amount ranges between 2% by mass and 25% by mass.

Also, in the case of mixing the polyarylene sulfide-derived resin having a branched structure and/or a crosslinked structure, the melt viscosity of the polyarylene sulfide-derived resin having a branched structure and/or a crosslinked structure is preferably 300 Pa·s to 3000 Pa·s. If the melt viscosity is no less than 300 Pa·s, sufficient melt tension is achieved, and if the melt viscosity is no greater than 3000 Pa·s, excellent moldability is achieved. More preferably, the melt viscosity ranges between 500 Pa·s and 2000 Pa·s. In this case, the melt viscosity is measured in accordance with ISO11443, and the measurement is obtained. More specifically, melt viscosity is measured using a flat die of 1 mmϕ×20 mmL as a capillary at a barrel temperature of 310° C. and a shear rate of 1000 $sec^{-1}$.

Olefinic Elastomer

In the present invention, an olefinic elastomer is, without specific limitation, a polymer or a copolymer having elastomeric properties and including an olefinic unit as a main component, and includes, for example, an ethylene-propylene copolymer, an ethylene-propylene-diene copolymer, an ethylene-octene copolymer and a copolymer of α-olefine with α,β-unsaturated carboxylic acid and its alkyl ester.

In point of the compatibility with the polyarylene sulfide-derived resin, as the olefinic elastomer used in the present invention, preference is given to using either olefinic copolymer or olefinic polymer containing functional group which comprise at least one functional group selected from an epoxy group, an acid anhydride group, a carboxyl group, a salt of the carboxyl group, and a carboxylic ester group. Among these, preference is given to an epoxy-containing olefinic copolymer from the point of view of heat-resistance, in which the copolymer is formed by copolymerizing a monomer having an epoxy group and another monomer. Because of good compatibility, particular preference is given to the epoxy-containing olefinic copolymer obtained by copolymerizing at least one α-olefine and at least one α,β-unsaturated acid glycidyl ester.

The olefinic copolymer comprising α-olefine and α,β-unsaturated acid glycidyl ester as main components includes a copolymer of α-olefine with α,β-unsaturated acid glycidyl ester or a copolymer of α-olefine, α,β-unsaturated acid glycidyl ester and a compound which can be copolymerized therewith. One compound or two or more compounds can be used as the above-mentioned copolymerizable compound. Furthermore, it is possible to use a graft copolymer in which one or two or more polymers or copolymers bind chemically to the copolymers so as to form a branch structure or a crosslink structure.

For example, α-olefine includes, but is not limited to, ethylene, propylene, and butylene. Among these α-olefines, preference is given to ethylene from the point of view of heat-resistance. Also, α,β-unsaturated acid glycidyl ester includes, but is not limited to, acrylic glycidyl ester, methacrylic glycidyl ester, and ethacrylic glycidyl ester. Among these α,β-unsaturated acid glycidyl esters, preference is given to methacrylic glycidyl ester from the point of view of heat-resistance.

A process for polymerizing α-olefine and α,β-unsaturated acid glycidyl ester is a generally known polymerization process. For example, it includes copolymerization by radical polymerization.

A ratio of α-olefine and α,β-unsaturated acid glycidyl ester is not particularly limited, but α-olefine preferably ranges from 70% by mass to 99% by mass, and α,β-unsaturated acid glycidyl ester preferably ranges from 1% by mass to 30% by mass. Because of compatibility, the above-mentioned range it preferable. More preferably, α-olefine ranges from 80% by mass to 95% by mass, and α,β-unsaturated acid glycidyl ester ranges from 5% by mass to 20% by mass.

Reinforced Fiber

A reinforced fiber includes a glass fiber; an asbestos fiber; a silica fiber; a silica-alumina fiber; an alumina fiber; a zirconia fiber; a boron nitride fiber; a silicon nitride fiber; a boron fiber; a potassium titanate fiber; a silicate fiber like Wollastonite; a magnesium sulfate fiber; an aluminum borate fiber; a metallic fibrous form such as stainless steel, aluminum, titanium, copper, or brass; or a carbon fibrous material such as carbon fiber, or carbon nanotube. Among these reinforced fibers, preference is given to glass fiber from the point of view of strength and modulus.

The reinforced fiber preferably has an average fiber length of no greater than 3 mm. And more preferably, ranges from 50 μm to 600 μm. If the average fiber length is within the above-mentioned range, a desired mechanical property is achieved without a practical problem.

Innermost Layer Containing the First Polyarylene Sulfide-Derived Resin Composition A content of the olefinic elastomer in the innermost layer is 5% by mass to 20% by mass. If the content is within the above-mentioned range, sufficient melt tension is achieved during blow molding.

A content of the olefinic elastomer in the innermost layer is preferably 5% by mass to 9% by mass. If the content is within the above-mentioned range, the following advantages are achieved. First, since the generation of gases can be suppressed during injection molding and mold deposit can be reduced, the mold maintenance frequency can be lowered. Second, the surface property of a molded article can be improved. Third, the stiffness at a high temperature (deflection temperature under load) can be improved.

Preferably, the melt viscosity of the first polyarylene sulfide-derived resin composition is, without specific limitation, from 300 Pa·s to 1500 Pa·s. Preferably, if the melt viscosity is no less than 300 Pa·s, sufficient melt tension is achieved, and if the melt viscosity is no greater than 1500 Pa·s, excellent moldability is achieved. More preferably, the melt viscosity ranges between 400 Pa·s and 800 Pa·s.

The polyarylene sulfide-derived resin composition in the innermost layer may additionally comprise a normal additive such as an antioxidant, a thermal stabilizer or a lubricant.

Outer layer containing the second polyarylene sulfide-derived resin composition

The second polyarylene sulfide-derived resin composition is a resin composition which blends from 5 parts by mass to 35 parts by mass of the reinforced fiber and 100 parts by mass of a third polyarylene sulfide-derived resin composition having 95% to 80% by mass of a polyarylene sulfide-derived resin and 5% to 20% by mass of an olefinic elastomer. If a content of the reinforced fiber is no less than 5 parts by mass based on 100 parts by mass of the third polyarylene sulfide-derived resin composition, sufficient mechanical strength is achieved; and if the content is no greater than 35 parts by mass, degradation of moldability, heat-resistance and mechanical strength can preferably be prevented. The desired content ranges between 10 parts by mass and 30 parts by mass based on 100 parts by mass of the third polyarylene sulfide-derived resin composition. Examples of the polyarylene sulfide-derived resin which is used in the third polyarylene sulfide-derived resin composition include the polyarylene sulfide-derived resin which is used in the first polyarylene sulfide-derived resin composition. Examples of the olefinic elastomer which is used in the third polyarylene sulfide-derived resin composition include the olefinic elastomer which is used in the first polyarylene sulfide-derived resin composition.

Furthermore, it is preferable to blend from 5% by mass to 20% by mass of the olefinic elastomer, based on an entire amount of the third polyarylene sulfide-derived resin composition, resulting in excellent moldability.

The melt viscosity of the second polyarylene sulfide-derived resin composition is preferably from 450 Pa·s to 800 Pa·s. Preferably, if the melt viscosity is no less than 450 Pa·s, sufficient melt tension is achieved, and if the melt viscosity is no greater than 800 Pa·s, excellent moldability is achieved. More preferably, the melt viscosity ranges between 500 Pa·s and 700 Pa·s.

Process for Preparation of the Polyarylene Sulfide-Derived Resin

In general, polyarylene sulfide-derived resin can be prepared by means of manufacturing equipment and process which are used in the preparation of a synthetic resin composition, and is prepared in the form of a pellet for molding by mixing essential components, melt-kneading and extruding by means of a single- or twin-screw extruder.

Process for Molding of the Multi-Layer Molded Article

A process for molding of the multi-layer molded article can be carried out by a known method, but is not limited thereto. For example, the process may include co-extrusion, co-extrusion sheet molding or co-extrusion blow molding. With these processes, it is possible to obtain a multi-layer molded article with a desired shape, such as a multi-layer sheet, a multi-layer pipe, a multi-layer tube and a multi-layer cup.

The process for molding of the multi-layer molded article of the present invention is preferably a three-dimensional blow molded method. A previously known method which is disclosed in Japanese Patent Application No. S63-126270 can be used in the three-dimensional blow molded method. The three-dimensional blow molded method makes it possible to easily mold the multi-layer molded article with a complicated shape. Also, if the three-dimensional blow molded method is used, molding the multi-layer molded article can be simultaneously carried out with arranging the mounting part for connecting the multi-layer molded article and other components to an end of the multi-layer molded article by means of the insert-molding.

Multi-Layer Molded Article

The multi-layer molded article according to the present invention is appropriately used as a pipe or a tube. The pipe or tube can be used for a variety of components through which high temperature liquid and gas flows. As one example, a pipe for use with an internal combustion engine is exemplified. Heat-resistance is required for a pipe for use with an internal combustion engine, and thus the multi-layer molded article of the present invention is preferably used as a component of an internal combustion engine. In particular, the polyarylene sulfide which constitutes the resin material of the multi-layer molded article according to the present invention has an excellent LLC (antifreeze solution having ethylene glycol as a main component)-resistance, and thus it can be preferably used as the radiator-pipe for the vehicle. A three-dimensional blow molding machine is preferably used to mold such multi-layer molded article. Also, it is possible to preferably employ a method which adds the glass fiber during melt-extrusion of the resin components. In addition, the multi-layer molded article of the present invention may have a branched structure which is formed by providing a through-hole.

The multi-layer molded article of the present invention is preferably a three-dimensional blow molded article, which can be used, in particular, as a radiator-pipe connecting an engine to a radiator for cooling a vehicle's engine.

To preferably use it as the radiator-pipe for vehicle, it is necessary to comply with many requirements such as heat-resistance, sufficient strength, moldability to the complicated shape and excellent LLC-resistance. In the case of the multi-layer molded article according to the present invention, the multi-layer molded article which is formed by the same resin is used the innermost layer and the resin layer in which the glass fiber is added, resulting in excellent adhesion between layers. Such excellent adhesion between layers prevents delamination, and thus it is possible to provide sufficient strength together with additional support by the glass fiber to the outer layer. Also, the complicated shape can be easily formed by blow molding.

In the case of a gasoline-powered engine heat-resistance has to comply with the temperature requirement of up to 120° C., and in the case of a diesel engine heat-resistance has to comply with temperature requirement of up to 150° C. A conventional resin pipe is produced by means of nylon, and thus could not be used with a diesel engine. But, in the present invention, only polyarylene sulfide-derived resin with excellent heat-resistance is used, and thus can be use with both a gasoline-powered engine and a diesel engine.

The radiator-pipe of a vehicle has a mounting part which is disposed to an end of the pipe and connects the radiator-pipe and other components. After molding the pipe, the mounting part may be disposed by bonding. However, it is desirable to simultaneously carry out three-dimensional blow molding of the radiator-pipe with insert molding.

Depending on applications, it is possible to appropriately set an internal diameter of the hollow part in the multi-layer molded article which is used as a radiator-pipe for a vehicle.

EMBODIMENTS/EXAMPLES

The examples which are illustrated below have been provided for the purpose of explaining the present invention in detail. However, such description is not intended to limit the present invention to the examples disclosed.

Example 1

First Polyarylene Sulfide-Derived Resin Composition Pellet

Firstly, 92.5% by mass of a polyphenylene sulfide resin (from Kureha Co., Ltd, FORTRON KPS; resin temperature 310° C., melt viscosity 140 Pa·s in shear rate 1200 sec$^{-1}$) and 7.5% by mass of an olefinic elastomer (MODIPER A4300 from NOF CORPORATION, copolymer obtained by graft polymerizing of 30 parts by mass of methyl methacrylate/butyl acrylate copolymer (9/12) with 70 parts by mass of ethylene/glycidyl methacrylate copolymer) was pre-mixed by means of a Henschel mixer.

Subsequently, the pre-mixed mixture was melt-kneaded by means of an extruder with a barrel temperature of 310° C., and a first polyphenylene sulfide-derived resin composition pellet was produced.

The melt viscosity of the first polyphenylene sulfide-derived resin composition pellet is 500 Pa·s.

Second Polyarylene Sulfide-Derived Resin Composition Pellet

A second polyphenylene sulfide-derived resin composition pellet was produced likewise to the first polyphenylene sulfide-derived resin composition pellet, except that 20 parts by mass of a chopped strand glass fiber with an average fiber diameter of 13 μm and an average fiber length of 3 mm was added 100 parts by mass of a resin component including 84.0% by mass of the polyphenylene sulfide resin, 12.5% by mass of the olefinic elastomer.

The melt viscosity of the second polyphenylene sulfide-derived resin composition pellet was 566 Pa·s.

Production of Multi-Layer Molded Article

The multi-layer molded article of the present invention was produced by injecting the first polyphenylene sulfide-derived resin composition and the second polyphenylene sulfide-derived resin composition into a three-dimensional multi-layer blow molding machine with two cylinder, and molding the both resins at a barrel temperature of 300° C. and a die temperature of 290° C. More specifically, the molding was carried out as follows.

Firstly, two polyphenylene sulfide-derived resin compositions heat-melted in the cylinder were introduced into the three-dimensional multi-layer blow molding machine, and a tubular parison was downwardly extruded from a die head with a tubular void, the tubular parison including the first polyphenylene sulfide-derived resin composition in the inner layer and the second polyphenylene sulfide-derived resin composition in the outer layer.

Subsequently, a tip of the parison was received on an upper surface of an opened lower mold combined with an upper mold to constitute a pair of the upper and lower molds, a die head was three-dimensionally transported along a cavity shape of the mold, and the parison was introduced into the cavity of the mold three-dimensionally formed. After transporting the parison, the parison was cut, a lower surface of the upper mold was positioned with the upper surface of the lower mold, and a blow pin for blowing compressed air into the parison was plunged.

Subsequently, blowing the compressed air into the parison via the blow pin resulted in pressing the parison to a molding surface of the mold together with cooling to mold a tubular molded article. During this, mold temperature was 150° C. and air pressure of the compressed air was 5 kg/cm$^2$.

The tubular molded article is a two-layered radiator-pipe 1 for vehicle, and includes a first connection part 10 for connect to an engine and a second connection part 11 for connect to a radiator. The connection parts have mounting parts for connecting the radiator-pipe 1 to the engine and the radiator, the mounting parts are attached to the radiator-pipe by simultaneously carry out the three-dimensional multi-layer blow molding of the radiator-pipe with insert molding. As a material of the mounting parts, a silicon rubber 12 is used due to the requirement of flexibility and heat-resistance. In the connection part between the radiator-pipe 1 and the silicon rubber 12, both of the first connection part 10 and the second connection part 11 are reinforced by means of a metallic band 13.

A thickness of the innermost layer in the two-layered radiator-pipe is 1 mm, a thickness of the outer layer which is added the reinforce fiber is 2 mm. An internal diameter of the hollow part is 8 mm; furthermore, the radiator-pipe has a complicated shape with curve at a distance of 80 mm, 200 mm and 80 mm from the first connection part.

Evaluation of Heat-Resistance

Figure 2:
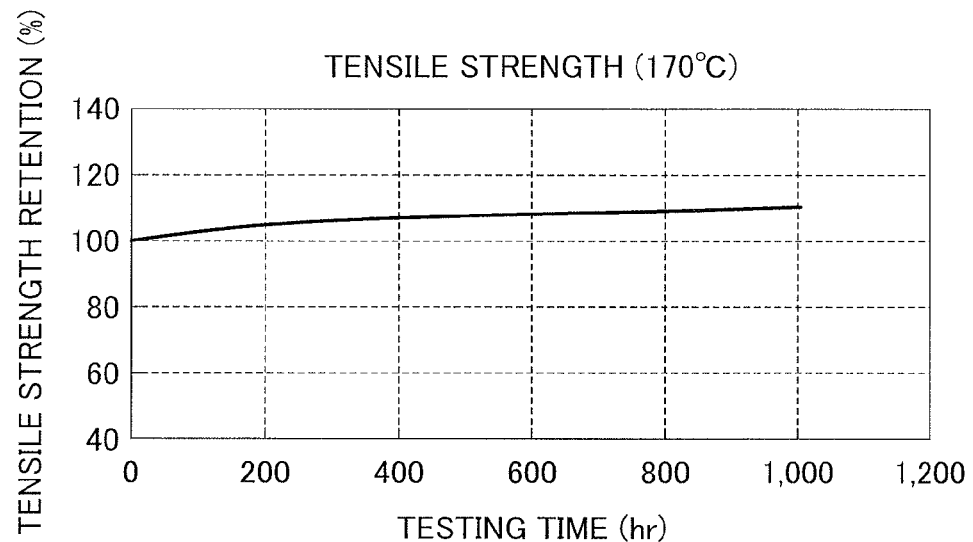
FIG. 2 is a view showing tensile strength of a radiator-pipe for a vehicle in an example.

The second polyphenylene sulfide-derived resin composition pellet is molded into a tensile testing specimen of ASTM 1 type at a cylinder temperature of 310° C. and mold temperature of 150° C. by means of an injection molding machine. Degradation of the tensile property was evaluated by heat-processing the tensile testing specimen for up to 1000 hours under heat-processing conditions of 170° C. in air. FIG. 2 shows an evaluation result of tensile strength, and FIG. 3 shows an evaluation result of tensile elongation.

Figure 3:
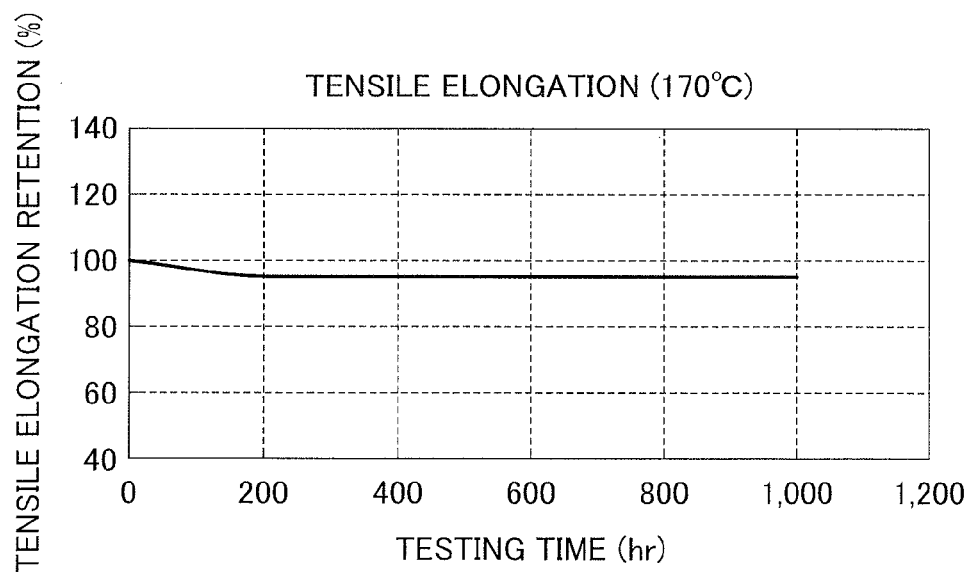
FIG. 3 is a view showing tensile elongation of a radiator-pipe for a vehicle in an example.

As can be seen from FIG. 2 and FIG. 3, the exemplarily radiator-pipe has sufficient heat-resistance due to use of the polyphenylene sulfide-derived resin.

Evaluation of Antifreeze Solution Resistance

Figure 4:
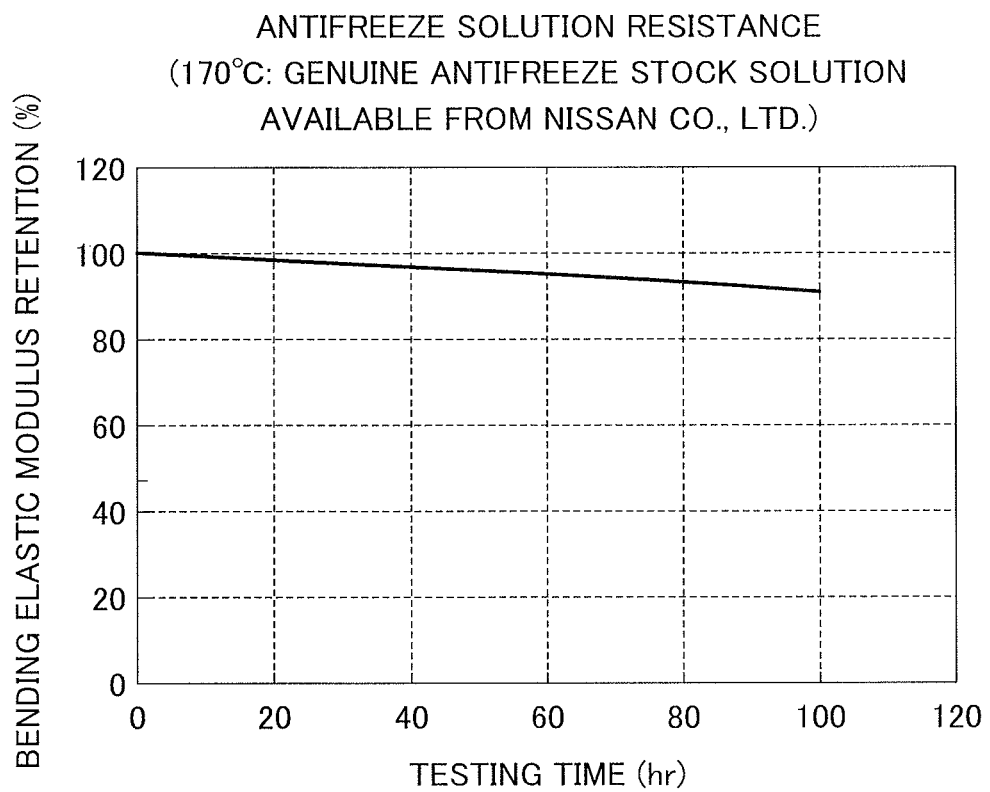
FIG. 4 is a view showing an antifreeze solution resistance of a radiator-pipe for a vehicle in an example.

The second polyarylene sulfide-derived resin composition pellet was molded into a flexural modulus testing specimen (⅛ inch×10 mm×60 mm) at a cylinder temperature of 310° C. and mold temperature of 150° C. by means of an injection molding machine. The flexural modulus testing specimen is impregnated with antifreeze solution (genuine antifreeze stock solution available from Nissan Co., Ltd), and degradation of the flexural modulus was evaluated for up to 100 hours under heat-processing conditions of 170° C. FIG. 4 shows an evaluation result.

As can be seen from FIG. 4, the exemplarily radiator-pipe has sufficient antifreeze solution resistance due to use of the polyphenylene sulfide-derived resin.

Evaluation of Delamination

After heat-processing the two-layered radiator-pipe for 1000 hours under heat-processing condition of 170° C. in air, the two-layered radiator-pipe was cut at an appropriate part, and the cut surface was impregnated with a red ink solution for one hour. After one hour, the cut surface was cleaned and observed, and a two-layered boundary surface could not be found.

Example 2

First Polyarylene Sulfide-Derived Resin Composition Pellet

Firstly, 92.4% by mass of a polyphenylene sulfide resin (from Kureha Co., Ltd, FORTRON KPS W214A; resin temperature 310° C., melt viscosity 130 Pa·s in shear rate 1216 sec$^{-1}$) and 7.6% by mass of an olefinic elastomer (MODIPER A4300 from NOF CORPORATION, copolymer obtained by graft polymerizing of 30 parts by mass of methyl methacrylate/butyl acrylate copolymer (9/12) with 70 parts by mass of ethylene/glycidyl methacrylate copolymer) was pre-mixed by means of a Henschel mixer.

Subsequently, the pre-mixed mixture was melt-kneaded by means of an extruder with a barrel temperature of 310° C., and a first polyphenylene sulfide-derived resin composition pellet was produced.

The melt viscosity of the first polyphenylene sulfide-derived resin composition pellet is 575 Pa·s.

Second Polyarylene Sulfide-Derived Resin Composition Pellet

A second polyphenylene sulfide-derived resin composition pellet was produced likewise to the first polyphenylene sulfide-derived resin composition pellet, except that 25.2 parts by mass of a chopped strand glass fiber with an average fiber diameter of 13 µm and an average fiber length of 3 mm was added 100 parts by mass of a resin component including 84.2% by mass of the polyphenylene sulfide resin and 15.8% by mass of the olefinic elastomer.

The melt viscosity of the second polyphenylene sulfide-derived resin composition pellet was 560 Pa·s.

Production of Multi-Layer Molded Article

The production of the multi-layer molded article of the present invention and the evaluations of the heat-resistance, the antifreeze solution resistance, and the delamination were performed using the first polyarylene sulfide-derived resin composition pellet and the second polyarylene sulfide-derived resin composition pellet in the same manner as Example 1. The results of the evaluations were the same as Example 1

Example 3

First Polyarylene Sulfide-Derived Resin Composition Pellet

Firstly, 92.4% by mass of a polyphenylene sulfide resin (from Kureha Co., Ltd, FORTRON KPS W214A; resin temperature 310° C., melt viscosity 130 Pa·s in shear rate 1216 sec$^{-1}$) and 7.6% by mass of an olefinic elastomer (Bondfast E from Sumitomo Chemical Co., Ltd., ethylene/glycidyl methacrylate copolymer (88/12)) was pre-mixed by means of a Henschel mixer.

Subsequently, the pre-mixed mixture was melt-kneaded by means of an extruder with a barrel temperature of 310° C., and a first polyphenylene sulfide-derived resin composition pellet was produced.

The melt viscosity of the first polyphenylene sulfide-derived resin composition pellet is 820 Pa·s.

Second Polyarylene Sulfide-Derived Resin Composition Pellet

A second polyphenylene sulfide-derived resin composition pellet was produced likewise to the first polyphenylene sulfide-derived resin composition pellet, except that 17.9 parts by mass of a chopped strand glass fiber with an average fiber diameter of 13 µm and an average fiber length of 3 mm was added 100 parts by mass of a resin component including 85.1% by mass of the polyphenylene sulfide resin and 14.9% by mass of the olefinic elastomer.

The melt viscosity of the second polyphenylene sulfide-derived resin composition pellet was 705 Pa·s.

Production of Multi-Layer Molded Article

The production of the multi-layer molded article of the present invention and the evaluations of the heat-resistance, the antifreeze solution resistance, and the delamination were performed using the first polyarylene sulfide-derived resin composition pellet and the second polyarylene sulfide-derived resin composition pellet in the same manner as Example 1. The results of the evaluations were the same as Example 1.

Example 4

First Polyarylene Sulfide-Derived Resin Composition Pellet

Firstly, 92.4% by mass of a polyphenylene sulfide resin (from Kureha Co., Ltd, FORTRON KPS W214A; resin temperature 310° C., melt viscosity 130 Pa·s in shear rate 1216 sec$^{-1}$) and 7.6% by mass of an olefinic elastomer (Bondfast E from Sumitomo Chemical Co., Ltd., ethylene/glycidyl methacrylate copolymer (88/12)) was pre-mixed by means of a Henschel mixer.

Subsequently, the pre-mixed mixture was melt-kneaded by means of an extruder with a barrel temperature of 310° C., and a first polyphenylene sulfide-derived resin composition pellet was produced.

The melt viscosity of the first polyphenylene sulfide-derived resin composition pellet is 820 Pa·s.

Second Polyarylene Sulfide-Derived Resin Composition Pellet

A second polyphenylene sulfide-derived resin composition pellet was produced likewise to the first polyphenylene sulfide-derived resin composition pellet, except that 25.3 parts by mass of a chopped strand glass fiber with an average fiber diameter of 13 µm and an average fiber length of 3 mm was added 100 parts by mass of a resin component including 84.2% by mass of the polyphenylene sulfide resin and 15.8% by mass of the olefinic elastomer.

The melt viscosity of the second polyphenylene sulfide-derived resin composition pellet was 800 Pa·s.

Production of Multi-Layer Molded Article

The production of the multi-layer molded article of the present invention and the evaluations of the heat-resistance, the antifreeze solution resistance, and the delamination were performed using the first polyarylene sulfide-derived resin composition pellet and the second polyarylene sulfide-derived resin composition pellet in the same manner as Example 1. The results of the evaluations were the same as Example 1.

Example 5

First Polyarylene Sulfide-Derived Resin Composition Pellet

Firstly, 63.3% by mass of a polyphenylene sulfide resin 1 (from Kureha Co., Ltd, FORTRON KPS W540; resin temperature 310° C., melt viscosity 500 Pa·s in shear rate 1216 $sec^{-1}$), 31.7% by mass of a polyphenylene sulfide resin 2 (from Kureha Co., Ltd, FORTRON KPS W214; resin temperature 310° C., melt viscosity 140 Pa·s in shear rate 1216 $sec^{-1}$), and 5.0% by mass of an olefinic elastomer (MODIPER A4400 from NOF CORPORATION, copolymer obtained by graft polymerizing of 30 parts by mass of styrene/acrylonitrile copolymer with 70 parts by mass of ethylene/glycidyl methacrylate copolymer) was pre-mixed by means of a Henschel mixer.

Subsequently, the pre-mixed mixture was melt-kneaded by means of an extruder with a barrel temperature of 310° C., and a first polyphenylene sulfide-derived resin composition pellet was produced.

The melt viscosity of the first polyphenylene sulfide-derived resin composition pellet is 400 Pa·s.

Second Polyarylene Sulfide-Derived Resin Composition Pellet

A second polyphenylene sulfide-derived resin composition pellet was produced likewise to the first polyphenylene sulfide-derived resin composition pellet, except that 17.8 parts by mass of a chopped strand glass fiber with an average fiber diameter of 13 µm and an average fiber length of 3 mm was added 100 parts by mass of a resin component including 62.7% by mass of the polyphenylene sulfide resin 1, 31.4% by mass of the polyphenylene sulfide resin 2, and 5.9% by mass of the olefinic elastomer.

The melt viscosity of the second polyphenylene sulfide-derived resin composition pellet was 450 Pa·s.

Production of Multi-Layer Molded Article

The production of the multi-layer molded article of the present invention and the evaluations of the heat-resistance, the antifreeze solution resistance, and the delamination were performed using the first polyarylene sulfide-derived resin composition pellet and the second polyarylene sulfide-derived resin composition pellet in the same manner as Example 1. The results of the evaluations were the same as Example 1

What is claimed is:

1. A multi-layer blow molded article comprising:
    an innermost layer including:
        a first polyarylene sulfide-derived resin composition having 95% to 91% by mass of a polyarylene sulfide-derived resin and 5% to 9% by mass of an olefinic elastomer; and
    an outer layer disposed on an outer-side of the innermost layer, including:
        a second polyarylene sulfide-derived resin composition having 5 to 35 parts by mass of reinforced fiber and 100 parts by mass of a third polyarylene sulfide-derived resin composition having 95% to 80% by mass of a polyarylene sulfide-derived resin and 5% to 20% by mass of an olefinic elastomer.

2. The multi-layer blow molded article according to claim 1, wherein the multi-layer blow molded article is a multi-layer cylindrical molded article.

3. The multi-layer blow molded article according to claim 1, wherein the melt viscosity of the first polyarylene sulfide-derived resin composition is from 300 Pa·s to 1500 Pa·s.

4. The multi-layer blow molded article according to claim 1, wherein the melt viscosity of the second polyarylene sulfide-derived resin composition is from 450 Pa·s to 800 Pa·s.

5. The multi-layer blow molded article according to claim 1, wherein the reinforced fiber is a glass fiber having an average fiber length of no greater than 3 mm.

6. The multi-layer blow molded article according to claim 1, wherein the multi-layer blow molded article is a three-dimensional blow molded article to be used as an internal combustion engine pipe.

7. The multi-layer blow molded article according to claim 6, further comprising a mounting part insert-molded simultaneously with molding the three-dimensional blow molded article.

* * * * *